US012590628B2

(12) United States Patent
Ziemba et al.

(10) Patent No.: US 12,590,628 B2
(45) Date of Patent: Mar. 31, 2026

(54) DUAL GEARBOX CENTRAL BEARING LAYOUT

(71) Applicant: Rivian IP Holdings, LLC, Irvine, CA (US)

(72) Inventors: Jefferey Ziemba, Novi, MI (US); Eric Sharkness, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 517 days.

(21) Appl. No.: 17/866,285

(22) Filed: Jul. 15, 2022

(65) Prior Publication Data

US 2024/0019020 A1     Jan. 18, 2024

(51) Int. Cl.
*F16H 57/021*     (2012.01)
*B60K 1/02*     (2006.01)
*F16H 57/023*     (2012.01)
*F16H 57/02*     (2012.01)

(52) U.S. Cl.
CPC ............. *F16H 57/021* (2013.01); *B60K 1/02* (2013.01); *F16H 57/023* (2013.01); *F16H 2057/02034* (2013.01); *F16H 2057/02052* (2013.01)

(58) Field of Classification Search
CPC .................... B60K 1/02; B60K 17/356; B60K 2007/0092; B60K 2023/043; B60K 2026/043; B60K 17/043; B60K 17/24; B60K 2007/0046; B60K 2007/0061; B60K 7/0007; B60K 17/02; B60K 17/04; B60Y 2410/10; B60Y 2410/1022; B60Y 2410/102; F16C 33/6614; F16C 33/6651; F16H 57/045; F16H 57/0454; F16H 57/0464; F16H 57/0471
See application file for complete search history.

(56) References Cited

U.S. PATENT DOCUMENTS

| | | | | |
|---|---|---|---|---|
| 8,336,655 | B2 * | 12/2012 | Knoblauch | .......... B60K 7/0007 477/3 |
| 2020/0164736 | A1 | 5/2020 | Verbridge et al. | |
| 2021/0379977 | A1 | 12/2021 | Williams et al. | |
| 2021/0381587 | A1 * | 12/2021 | Williams | ............. B60K 17/043 |

* cited by examiner

*Primary Examiner* — Victor L MacArthur
(74) *Attorney, Agent, or Firm* — HG LAW LLP

(57) ABSTRACT

Systems and methods are presented herein for an interface that reduces loads transferred across the interface, wherein the interface couples a pair of independently actuated rotating shafts. A first tapered bearing is coupled to a first rotating shaft. A second tapered bearing is coupled to a second rotating shaft. A central bearing is arranged between the first rotating shaft and the second rotating shaft. The first rotating shaft and the second rotating shaft are preloaded against each other through the central bearing. The central bearing enables the forces generated by one rotating shaft to oppose and cancel out the forces generated by the second rotating shaft.

19 Claims, 6 Drawing Sheets

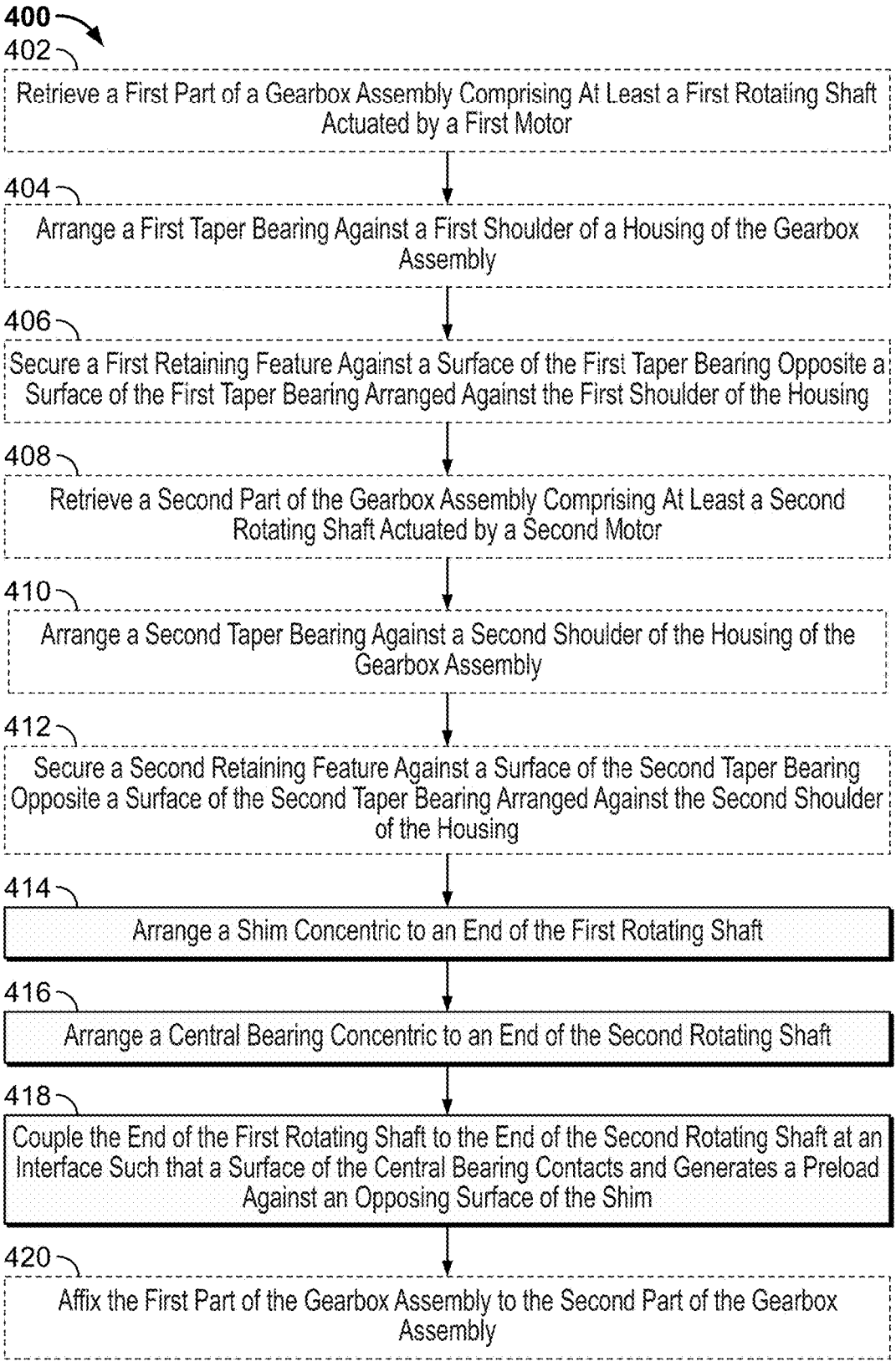

400

402
Retrieve a First Part of a Gearbox Assembly Comprising At Least a First Rotating Shaft Actuated by a First Motor 404
Arrange a First Taper Bearing Against a First Shoulder of a Housing of the Gearbox Assembly 406
Secure a First Retaining Feature Against a Surface of the First Taper Bearing Opposite a Surface of the First Taper Bearing Arranged Against the First Shoulder of the Housing 408
Retrieve a Second Part of the Gearbox Assembly Comprising At Least a Second Rotating Shaft Actuated by a Second Motor 410
Arrange a Second Taper Bearing Against a Second Shoulder of the Housing of the Gearbox Assembly 412
Secure a Second Retaining Feature Against a Surface of the Second Taper Bearing Opposite a Surface of the Second Taper Bearing Arranged Against the Second Shoulder of the Housing 414
Arrange a Shim Concentric to an End of the First Rotating Shaft 416
Arrange a Central Bearing Concentric to an End of the Second Rotating Shaft 418
Couple the End of the First Rotating Shaft to the End of the Second Rotating Shaft at an Interface Such that a Surface of the Central Bearing Contacts and Generates a Preload Against an Opposing Surface of the Shim 420
Affix the First Part of the Gearbox Assembly to the Second Part of the Gearbox Assembly

FIG. 4

DUAL GEARBOX CENTRAL BEARING LAYOUT

INTRODUCTION

The present disclosure is directed to a gearbox bearing layout, and more particularly, to systems and methods that reduce or eliminate axial gear loading in a gearbox before a load is transferred to rotational dynamic bearings and gearbox housing features, thereby preventing deflection of components of the rotational dynamic bearings and the gearbox housing features.

SUMMARY

A gearbox assembly may, for example, incorporate helical gears which transfer rotational inputs from respective motors to meshed components in the gearbox assembly. During the transfer of the inputs, various components within the gearbox assembly may experience axial and other loads which are eventually translated throughout the gearbox assembly, including to the housing of the gearbox assembly. The arrangement of the gears may resolve a portion of the loads translated throughout the gearbox assembly; however, the arrangement alone may not be sufficient to reduce the required strength and sizing of various housing interfaces or bearings throughout the gearbox assembly. Bearings arranged to stabilize interfacing gears of the gearbox assembly are configured to resolve loads experienced by the interfacing gears. As a result, the bearings are structured to withstand loads transferred through the gearbox assembly. Larger loads lead to structurally larger bearings which increase the size and weight of the gearbox assembly.

In accordance with some embodiments of the present disclosure, a gearbox assembly incorporates an axially aligned concentric central bearing (e.g., under preload by a shim) that interfaces with and stabilizes two gears and prevents or reduces transfer of large loads to stabilizing bearings arranged away from the central interface. This configuration also reduces loads experiences by various housing components of the gearbox assembly. For example, by arranging a central bearing between two adjacent gears such that the central bearing is preloaded, axial gear loading is cancelled before the load is transferred to dynamic stabilizing bearings arranged laterally away from the central interface between the two gears. Additionally, the housing in which the two adjacent gears operates will not experience the axial loading cancelled by the preloaded central bearing. By cancelling this load through the central bearing, the life of the external dynamic bearings increases. Alternatively, or additionally, the size of the bearings to maintain operation of the gear box assembly for a desired lifetime may also be reduced. The reduction of housing deflection also reduces misalignment of the gears interfacing in the gearbox assembly and may also lead to a reduction in the size and weight of the housing and components comprising the housing.

In some embodiments, a gearbox assembly of the present disclosure comprises a first tapered bearing coupled to a first rotating shaft and a second tapered bearing coupled to a second rotating shaft. A central bearing is arranged between the first rotating shaft and the second rotating shaft. The first rotating shaft and the second rotating shaft are preloaded against each other through the central bearing. For example, the preload may be set by arranging a shim between the central bearing and an end of one of the first rotating shaft and the second rotating shaft.

This arrangement of gearbox components solve the problems of other approaches described above. This approach does not rely on the strength or durability of either the features of the gearbox housing or the tapered bearings. Thus, these components are not required to be structured to withstand as high loads during operation and therefore may be reduced in size, weight, and complexity. Additionally, this approach does not require tapered bearings to provide exact alignment of the two rotating shafts nor are the tapered bearings required to withstand as high axial loads. By introducing the central bearing between the two rotating shafts and applying a preload to the central bearing (e.g., via the placement of a shim between one side of the central bearing and at least one of the rotating shafts), as opposed to relying on the strength and alignment of gearbox housing features encasing the tapered bearings, the gearbox can cancel opposing loads between the two rotating shafts by coupling them to the preloaded central bearing. The approach, therefore, increases the lifetime of the gearbox assembly by reducing the net loads across the interface between the two rotating shafts.

In some embodiments, the first rotating shaft and the second rotating shaft are preloaded against each other by a shim arranged between a surface of the central bearing and an end of the first rotating shaft or the second rotating shaft. The shim is configured to compress in response to opposing loads received from the first tapered bearing and the second tapered bearing.

In some embodiments, the first tapered bearing and the second tapered bearing are arranged such that a first back face of the first tapered bearing is facing an opposed second back face of the second tapered bearing. A preload generated between the first rotating shaft and the second rotating shaft is focused toward the central bearing. Additionally, the first tapered bearing may be arranged to oppose axial loads from the second rotating shaft through the first rotating shaft. The second tapered bearing may also be arranged to oppose axial loads from the first rotating shaft through the second rotating shaft. In some embodiments, the first rotating shaft is actuated independent of the second rotating shaft and the second rotating shaft is actuated independent of the first rotating shaft.

In some embodiments, a first helical gear is affixed to the first rotating shaft and a second helical gear is affixed to the second rotating shaft. The second helical gear comprises an opposite handedness to the first helical gear. The first helical gear and second helical gear are configured such that when both the first and second helical gears are driven in a same rotational direction, axial forces generated by each respective helical gear are cancelled through the central bearing. For example, the axial forces may result in wobble (e.g., at least one of oscillation, rotation, vibration, or movement of at least one component of each respective bearing assembly, such as a bearing housing, a race, a race support, a retainer, or cover, wherein the at least one of oscillation, rotation, vibration, or movement is unaligned with the functional capabilities or intended movement or actuation of each respective bearing assembly relative to an installation position or orientation) in the helical gears which may be negated due to their opposing vectors by the coupling of the two rotating shafts via the central bearing.

In some embodiments, a first retaining feature is arranged against a first surface of the first tapered bearing and is configured to secure the first tapered bearing against a first shoulder of a housing. A second retaining feature is also arranged against a first surface of the second tapered bearing and is configured to secure the second tapered bearing against a second shoulder of a housing. Additionally, the gearbox assembly may further comprise a housing. The housing comprises a first groove or bearing bore configured to receive the first tapered bearing, wherein the first groove or bearing bore comprises a first shoulder arranged to abut a second surface of the first tapered bearing. The housing also comprises a second groove or bearing bore configured to receive the second tapered bearing, wherein the second groove or bearing bore comprises a second shoulder arranged to abut a second surface of the second tapered bearing. A central axis of the first groove or bearing bore and a central axis of the second groove or bearing bore are aligned.

In some embodiments, the aspects of the present disclosure are incorporated into a dual motor powertrain comprising a first motor coupled to a first gearbox assembly and a second motor coupled to a second gearbox assembly. A coupling between axial ends of a first shaft of the first gearbox assembly and a second shaft of the second gearbox assembly is configured to cancel axial loads generated by each of the first shaft and the second shaft. A central bearing is arranged between an axial end of the first rotating shaft and an axial end of the second rotating shaft, wherein the first rotating shaft and the second rotating shaft are preloaded against each other by a shim arranged between a surface of the central bearing and the axial end of the first rotating shaft or the second rotating shaft. In some embodiments, the shim is configured to compress in response to opposing loads received from the first gearbox assembly and the second gearbox assembly.

In some embodiments, the first gearbox assembly comprises a first tapered bearing arranged concentric to a first rotating shaft. Additionally, the second gearbox assembly comprises a second tapered bearing arranged concentric to the second rotating shaft. The coupling may comprise a central bearing. In some embodiments, the first tapered bearing and the second tapered bearing are arranged such that a first back face of the first tapered bearing is facing an opposed second back face of the second tapered bearing. A preload generated between the first rotating shaft and the second rotating shaft is focused toward the central bearing.

In some embodiments, a first retaining feature is arranged against a first surface of a first tapered bearing concentric to the first shaft and is configured to secure the first tapered bearing against a first shoulder of a housing. Additionally, a second retaining feature is arranged against a first surface of a second tapered bearing concentric to the second shaft and is configured to secure the second tapered bearing against a second shoulder of a housing.

In some embodiments, the gearbox assembly further comprises a housing, wherein the housing comprises a first groove or bearing bore configured to receive a first tapered bearing, wherein the first groove or bearing bore comprises a first shoulder arranged to abut a second surface of the first tapered bearing. The housing may further comprise a second groove or bearing bore configured to receive a second tapered bearing, wherein the second groove or bearing bore comprises a second shoulder arranged to abut a second surface of the second tapered bearing. Additionally, a shim is configured to compress in response to opposing loads received from a first tapered bearing, concentric to the first shaft, and a second tapered bearing, concentric to the second shaft. In some embodiments, the coupling comprises a central bearing that is one of a flexure bearing, a composite bearing, a rolling-element bearing, a fluid bearing, or a magnetic bearing.

In some embodiments, the disclosure is directed to a method of assembling a gearbox assembly configured to reduce transferred loads generated by coupled rotating shafts. A shim is arranged concentric to an end of a first rotating shaft. A central bearing is arranged concentric to an end of a second rotating shaft. The end of the first rotating shaft is coupled to the end of the second rotating shaft at an interface such that a surface of the central bearing contacts and generates a preload against an opposing surface of the shim.

BRIEF DESCRIPTIONS OF THE DRAWINGS

The above and other objects and advantages of the disclosure may be apparent upon consideration of the following detailed description, taken in conjunction with the accompanying drawings, in which:

FIG. 4 is a flow chart representing an illustrative process for reducing loads transferred through a gearbox assembly, in accordance with some embodiments of the disclosure;

DETAILED DESCRIPTION

Methods and systems are provided herein for reducing or eliminating loads transferred between interfacing components of a gearbox assembly based on an arrangement of bearings throughout the gearbox assembly.

Figure 1:
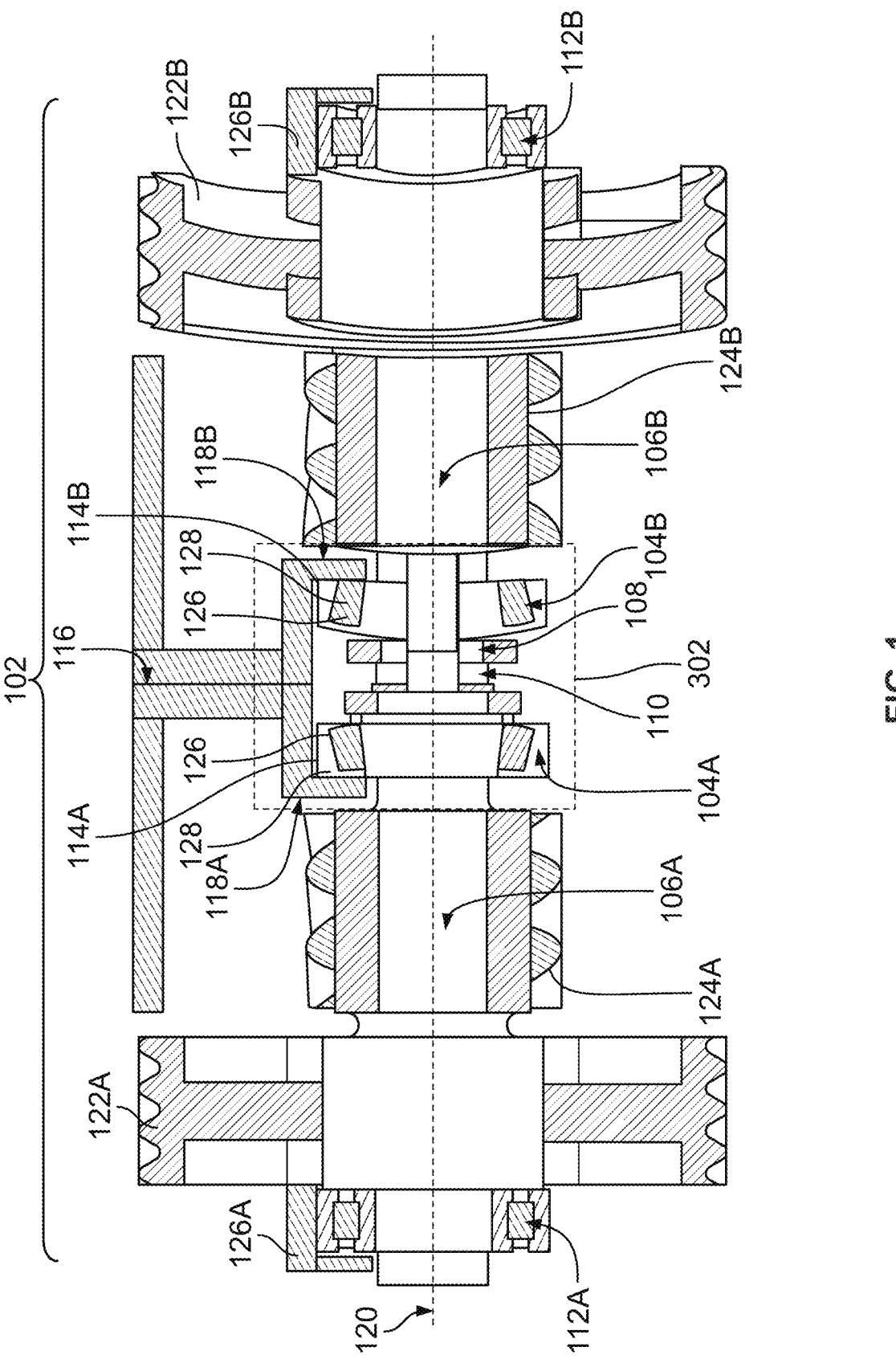
FIG. 1 depicts a cross sectional view of a gearbox assembly comprising a central bearing arranged on a central axis, in accordance with some embodiments of the disclosure.

FIG. 1 depicts a cross sectional view of gearbox assembly 102 comprising central bearing 110 arranged on central axis 120, in accordance with some embodiments of the disclosure. Gearbox assembly 102 may comprise fewer, or additional, features than those depicted in FIG. 1. Gearbox assembly 102 may comprise any features or may be used in combination with any element depicted in, or described in reference to, FIGS. 2-6.

Gearbox assembly 102 comprises first tapered bearing 104A and second tapered bearing 104B. As shown in FIG. 1, each of first tapered bearing 104A and second tapered bearing 104B are arranged such that a back face of tapered rollers 126 and cones 128 of each respective tapered bearing faces a central interface concentric to central axis 120. The orientation of the respective tapered bearings assists with directing forces, transmitted from a powertrain or motor through components of gearbox assembly 102, towards central bearing 110 as part of shaft coupling interface 302 (e.g., corresponding to shaft coupling interfaces 302A-C of FIG. 3). If central bearing 110 is not utilized in the assembly, the orientations of each of the tapered bearings may be reversed. For example, the left tapered bearing would oppose forces from the right shaft and the right tapered bearing opposes forces from the left shaft. As a result, in such cases, each of the tapered bearings would be structured to withstand opposing forces directly and the features of the housing surrounding the tapered bearings would also be sized and structured according to the magnitude of the loads.

In some embodiments central bearing 110 comprises at least one of a thrust bearing, a flexure bearing, a composite bearing, a rolling-element bearing, a fluid bearing, or a magnetic bearing. Additionally, the orientation of first tapered bearing 104A and second tapered bearing 104B may eliminate the need for shims to be installed on one or both sides of first tapered bearing 104A and second tapered bearing 104B to stabilize rotational motion caused by first rotating shaft 106A and second rotating shaft 106B. By eliminating a need for two or more shims arranged to abut each of first tapered bearing 104A and second tapered bearing 104B, the interfaces comprising gearbox housing 116 may comprise smaller dimensions and therefore are reduced in weight. The orientation of first tapered bearing 104A and second tapered bearing 104B also reduces the net effect of loads experienced by each of first tapered bearing 104A and second tapered bearing 104B as the opposing loads cancel out the net force experienced by each respective tapered bearing, thereby reducing the size and durability requirements for each respective tapered bearing, at least in part due to a reduced preload on each respective tapered bearing.

First retaining feature 114A and second retaining feature 114B secure each of first tapered bearing 104A and second tapered bearing 104B against each of first shoulder 118A and second shoulder 118B, respectively. Each of first shoulder 118A and second should 118B comprise material from gearbox housing 116. In some embodiments, gearbox housing 116 comprises either two halves or two ends with a central housing portion which are configured to interface with each other to encompass all the components of gearbox assembly 102. First retaining feature 114A and second retaining feature 114B may each comprise a snap ring, a threaded ring, or some other elements configured to secure a bearing against at least one of first shoulder 118A or second shoulder 118B. In some embodiments, first shoulder 118A and second shoulder 118B comprise snap rings such that the combined loading of first shoulder 118A and second shoulder 118B when paired with retaining features 114A and 114B reduce or prevent lateral movement of each of first tapered bearing 104A and second tapered bearing 104B. The use of snap rings on either side of first tapered bearing 104A and second tapered bearing 104B reduces weight and complexity of gearbox housing 116 and may also provide an easier manufacturing process when arranging and aligning the various components and elements of gearbox assembly 102.

In some embodiments, the arrangement of first tapered bearing 104A and second tapered bearing 104B changes the load path of some of the loads generated along first rotating shaft 106A and second rotating shaft 106B from a central portion of gearbox assembly 102, corresponding to central bearing 110, to an external load path resulting in secondary retaining features 126A and 126B being arranged and configured to withstand the transmitted loads while stabilizing first dynamic bearing 112A and second dynamic bearing 112B. Arranged concentric to central axis 120 and abutting a laterally outboard surface of output gears 122A and 122B are first dynamic bearing 112A and second dynamic bearing 112B. Encompassing each of first dynamic bearing 112A and second dynamic bearing 112B are secondary retaining features 126A and 126B, respectively. Each of first dynamic bearing 112A and second dynamic bearing 112B may comprise locating features that prevent axial loadings from being transferred towards either of first tapered bearing 104A and second tapered bearing 104B, which, in such cases, may also allow each of first dynamic bearing 112A and second dynamic bearing 112B to comprise cylindrical bearings, which tend to prevent load transmission, as opposed to tapered bearings, which tend to direct and transmit loads.

Central bearing 110 is subjected to a preload, wherein central bearing 110 enables first rotating shaft 106A and second rotating shaft 106B to preloaded against each other (e.g., when shim 108 is arranged between a surface of central bearing 110 and a surface of at least one of first rotating shaft 106A or second rotating shaft 106B), when arranged concentric to central axis 120 (e.g., corresponding to a central axis of at least one of first rotating shaft 106A and second rotating shaft 106B) and gearbox assembly 102 is assembled such that each portion of gearbox housing 116 are affixed in a final assembly orientation. Central bearing 110 is configured to maintain a target preload (e.g., 1000-2000N based on a target number of cycles for at least one of central bearing 110, first tapered bearing 104A, or second tapered bearing 104B), regardless of thermal growth experienced by at least one of central bearing 110 or the other components interfacing with the surfaces engaged with central bearing 110. Thermal growth typically reduces preload and as a result, central bearing 110 is configured to experience thermal growth without reducing the preload to a value below the target preload. For example, central bearing 110 may comprise an integrated race configured to withstand conditions during operation of gearbox assembly 102 without deforming either plastically or elastically. Additionally, by arranging each of first tapered bearing 104A and second tapered bearing 104B as shown in FIG. 1 such that the preload is directed towards central bearing 110, the bearing losses resulting from the preload are limited to the frictional losses in central bearing 110. For example, if first tapered bearing 104A and second tapered bearing 104B are arranged such that the back face of the tapered roller and cone of each respective tapered bearing do not face the central interface depicted by central bearing 110, then central bearing 110 would not be subjected to a preload and frictional losses from loads experienced by each of first tapered bearing 104A, and second tapered bearing 104B would yield rotational bearing losses, decreasing efficiency of load translation within gearbox assembly 102. Central bearing 110 is configured to provide an interface which at least partially or substantially cancels out forces transmitted through first rotating shaft 106A and second rotating shaft 106B (e.g., a net force at central bearing 110 is substantially similar to or equal to zero as axial loads transmitted through first rotating shaft 106A and second rotating shaft 106B may be substantially equivalent with opposing directional vectors resulting in a net cancellation of forces), further reducing power loss via bearing sourced friction in response to the preload as the preload is focused towards central bearing 110 instead of the other depicted interfaces of FIG. 1.

Figure 2:
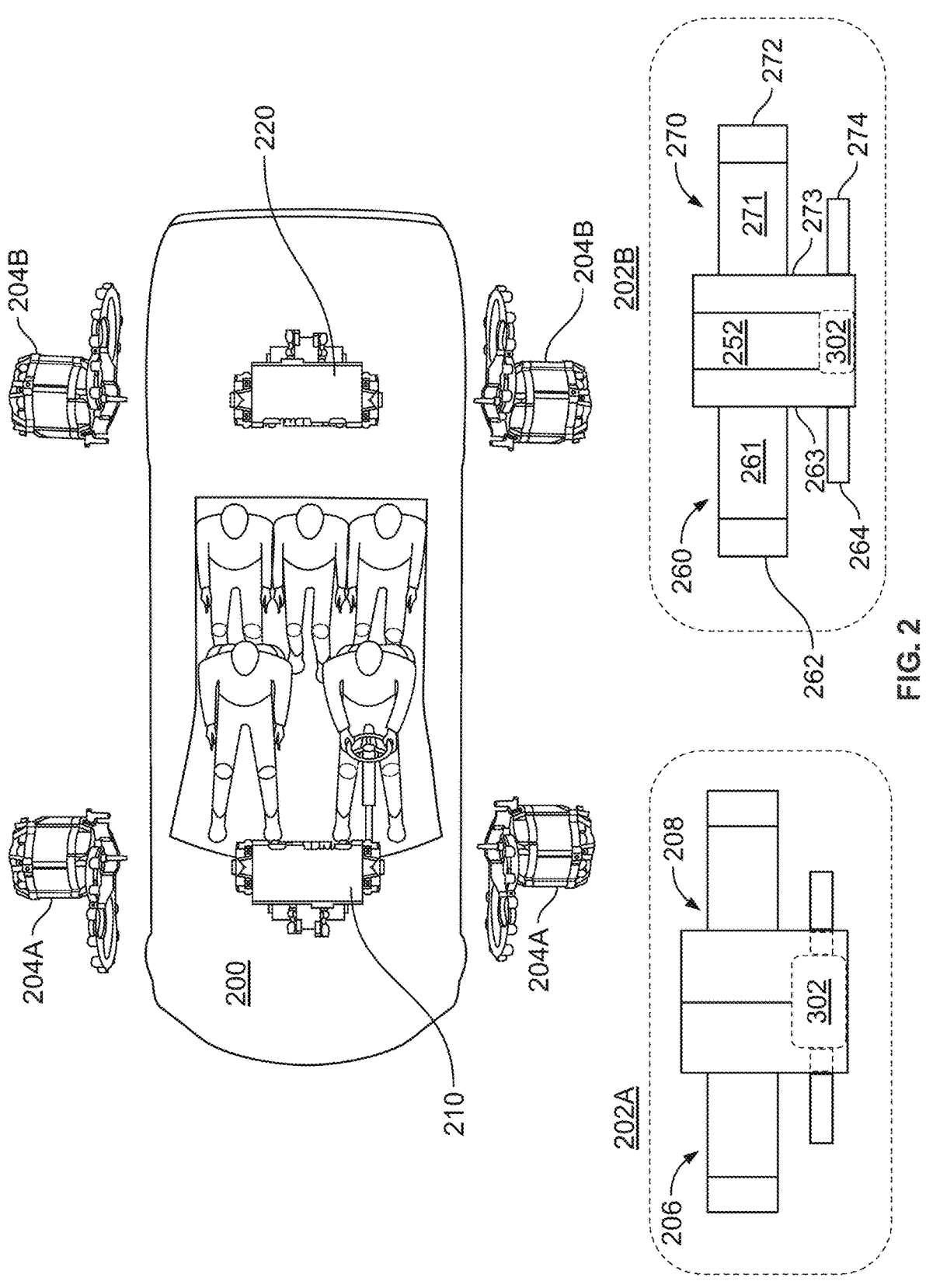
FIG. 2 depicts a top view of an exemplary vehicle assembly comprising a pair of gear box assemblies; in accordance with some embodiments of the disclosure.
Figure 3:
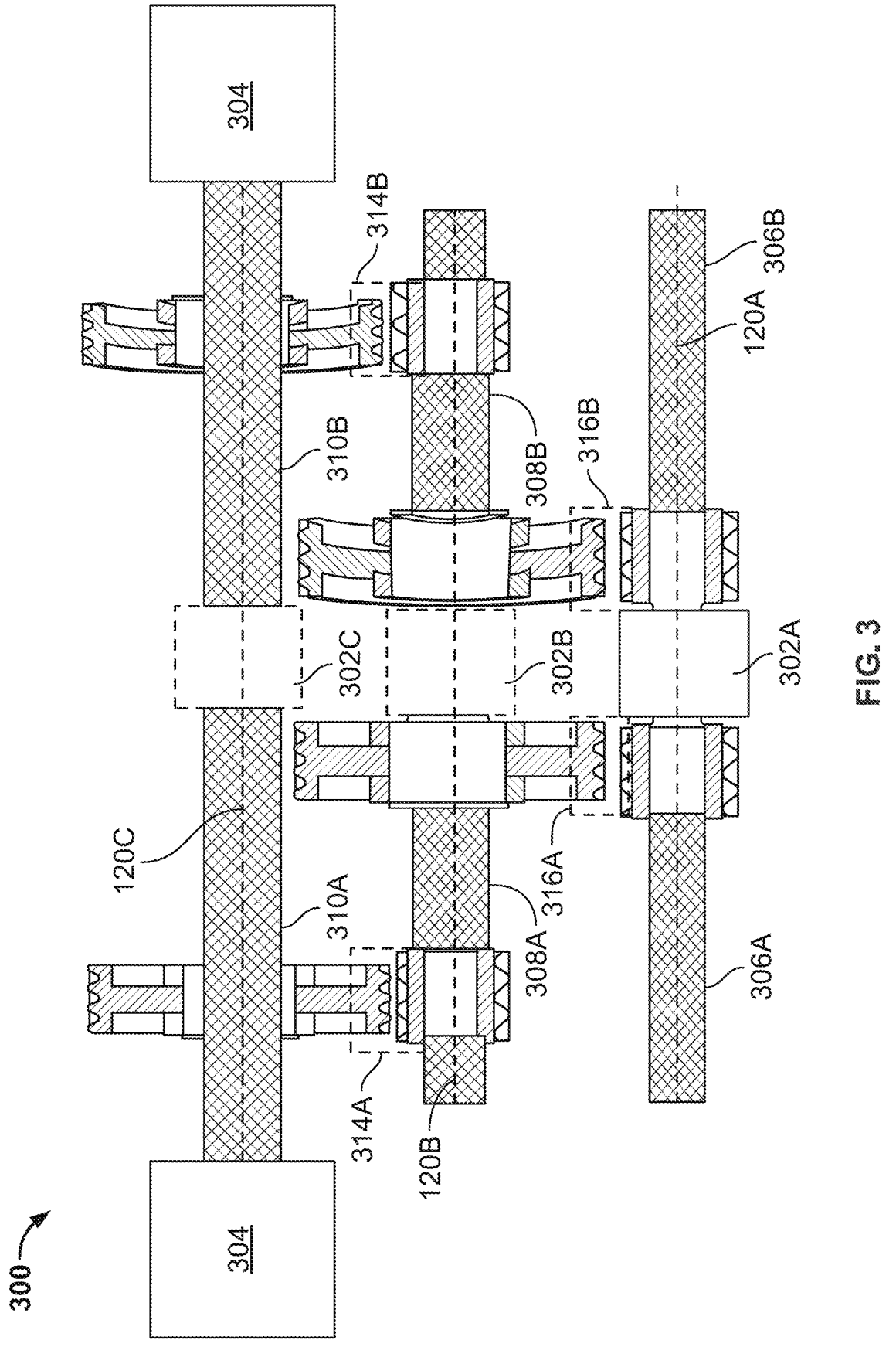
FIG. 3 depicts a cross sectional view of a gearbox assembly comprising multiple gear interfaces, in accordance with some embodiments of the disclosure.

Each of first rotating shaft 106A and second rotating shaft 106B may be at least one of actuated by or driven by separate motors (e.g., as depicted in FIG. 2). Arranged along each of first rotating shaft 106A and second rotating shaft 106B are load transfer gears 124A and 124B, respectively, as well as output gears 122A and 122B, respectively. Torque may be transferred through each of first rotating shaft 106A and second rotating shaft 106B, and through each of load transfer gears 124A and 124B as well as output gears 122A and 122B, by motors arranged along central axis 120 or by gears interfacing with at least one of load transfer gears 124A and 124B and/or at least one of output gears 122A and 122B (e.g., as depicted in FIG. 3). The torque generated at each gear interface and/or along each of first rotating shaft 106A and second rotating shaft 106B results in at least axial loads being experienced by at least one of load transfer gears 124A and 124B and/or at least one of output gears 122A and 122B. The arrangement and structure of central bearing 110, when paired with a target preload, results in these motion sourced loads being resolved at central bearing 110 such that the loads do not affect any other depicted component of gearbox assembly 102. Additionally, the target preload experience by central bearing 110 prevents relative rolling of either first rotating shaft 106A or second rotating shaft 106B, which, if not prevented, would create additional loads to be transferred throughout interfaces of gearbox assembly 102.

The target preload on central bearing 110 may be generated by incorporating shim 108 between at least one surface of central bearing 110 and either first retaining feature 114A or second retaining feature 114B. Shim 108 is arranged concentric to central axis 120 (e.g., shim 108 is arranged between a surface of the central bearing and an end of the first rotating shaft or the second rotating shaft such that a central axis of shim 108 is substantially aligned with at least one of a central axis of the first rotating shaft or the second rotating shaft) and may comprise hardened spring steel (or another suitable material for the operating conditions within gearbox assembly 102) depending on the configuration of the race of each of central bearing 110, first tapered bearing 104A, and/or second tapered bearing 104B. For example, if the race of each bearing is configured to withstand the target preload, then shim 108 may be configured to abut the race of at least two of these bearings. Shim 108 is required to reduce gear shuttling and gear slop which results from a gear/bearing interface which is not subjected to a target preload. Additionally, shim 108 is configured to induce opposed preloads towards each of first tapered bearing 104A and second tapered bearing 104B to prevent sliding of each tapered bearing. In some embodiments, the target preload induced on central bearing 110 eliminates the need for first tapered bearing 104A and second tapered bearing 104B such that each may be replaced by ball bearings or cylindrical rolling bearings. The use of shim 108 in the arrangement depicted in FIG. 1 to ensure central bearing 110 experiences the target preload creates a reduction in rotational losses (e.g., friction losses) that would otherwise be experienced by motors separately actuating each of first rotating shaft 106A and second rotating shaft 106B. This arrangement is particularly beneficial in gearbox assemblies that may receive rotational inputs of different speeds from different motors (e.g., a vehicle system comprising opposing motor assemblies on either side of a gearbox assembly as shown in FIG. 2).

FIG. 2 shows vehicle assembly 200 comprising front gearbox assembly 210 and rear gearbox assembly 220. Vehicle assembly 200 may comprise fewer, or additional, features than those depicted in FIG. 2. Vehicle assembly 200 may comprise any features or may be used in combination with any element depicted in, or described in reference to, FIGS. 1 and 3-6. Additionally, each of front gearbox assembly 210 and rear gearbox assembly 220 may comprise at least one of gearbox assembly 202A and/or 202B. Each of gearbox assembly 202A and 202B may comprise any or all the gearbox assembly components depicted in or described in reference to FIGS. 1 and 3-6.

As shown in FIG. 2, vehicle assembly 200 may include two or more electric motors, arranged to interface with one or more gearbox assemblies. For example, some of the motor assemblies may be identical, while some may have different handedness or shaft rotation direction relative to the motor. As illustrated, front gearbox assembly 210 and rear gearbox assembly 220 are oriented differently. The components and orientation of front gearbox assembly 210 and rear gearbox assembly 220 may be the same or different to accommodate suitable shaft rotations and fitment within the vehicle. Also illustrated are exploded views of front motor assemblies 204A, and rear motor assemblies 204B. Motor assemblies 204A are configured to interface with front gearbox assembly 210 (e.g., along with other components such as an intermediate housing, a central bearing coupling rotating shafts, etc.). Motor assemblies 204B are configured to interface with rear gearbox assembly 220 (e.g., along with other components such as an intermediate housing, a central bearing coupling rotating shafts, etc.).

Front gearbox assembly 210 and rear gearbox assembly 220 may each include shaft coupling interface 302 of FIG. 1, output shaft clutches, or both, to control the number of motors used, the number of output shafts driven, the independence of output shafts, or a combination thereof. In some circumstances, only a front drive axis corresponding to front gearbox assembly 210 may be powered (e.g., via one or both of front motor assemblies 204A), and a rear drive axis corresponding to rear gearbox assembly 220 may be neutralized (e.g., non-powered and allowed to freewheel by not receiving inputs from either of rear motor assemblies 204B). In a further example, in some circumstances, both the front drive axis and the rear drive axis may be powered (e.g., via one or both motors at each axis). In some embodiments, only one of front gearbox assembly 210 and rear gearbox assembly 220 include shaft coupling interface 302 of FIG. 1.

FIG. 2 also depicts gearbox assemblies 202A and 202B. Gearbox assembly 202A includes two separate motor drives 206 and 208, each including a motor, gearbox (e.g., a housing), and output (e.g., an output spline or output half-shaft). Shaft coupling interface 302 is configured to couple rotating shafts based on the output of motor drives 206 and 208. The housings of motor drives 206 and 208 interface to each other to form a stationary housing. Each of motor drives 206 and 208 may be directed coupled by respective housings which form an overall housing of gearbox assembly 202A. Gearbox assembly 202B includes motor drives 260 and 270 in an assembled state. For example, motor drives 260 and 270 may be affixed to intermediate housing 252 using fasteners (e.g., bolts, threaded studs, and nuts), clamps, latches, mechanical interlocks, any other suitable features to affix components to each other, or any combination thereof. In some embodiments, intermediate housing 252, motor drive 260, motor drive 270, or a combination thereof may include alignment features that spatially align two or more components, constrain relative motion, or both. For example, intermediate housing 252 may allow each of motor drives 260 and 270 to be shorter (e.g., along the left-right axis, as illustrated in FIG. 2) and intermediate housing 252 may be configured to house shaft coupling interface 302.

FIG. 3 depicts gearbox assembly 300 comprising multiple gear interfaces, in accordance with some embodiments of the disclosure. Gearbox assembly 300 may comprise fewer, or additional, features than those depicted in FIG. 3. Gearbox assembly 300 may comprise any features or may be used in combination with any element depicted in, or described in reference to, FIGS. 1, and 4-6.

Gearbox assembly 300 comprises three central axes 120A-C, each corresponding to central axis 120 of FIG. 1. As in FIG. 1, rotating shafts 310A and 310B are independently driven by respective motor drives 304. Based on gear meshes between each of central axes 120A-C and the rotational inputs of motor drives 304, each side of gearbox assembly 300 comprises up to three pairs of rotating shafts. In some embodiments, each of the pairs of rotating shafts are axially aligned, as shown in FIG. 3, and are coupled using shaft coupling interface 302 of FIG. 1 and as depicted in FIG. 2. In some embodiments, central bearing 110 of FIG. 1 axially aligned each pair of rotating shafts and cancels out opposing loads from each respective shaft. Arranged towards the lateral center of each of central axes 120A-C is a respective one of shaft coupling interfaces 302 A-C. Each of shaft coupling interfaces 302 A-C comprises at least the components depicted and described in FIG. 1 in reference to shaft coupling interface 302 (e.g., at least a pair of tapered bearings and a preloaded central bearing arranged concentric to a pair of rotating shafts). Each of rotating shafts 306A, 308A, and 310A corresponds to rotating shaft 106A of FIG. 1. Each of rotating shafts 306B, 308B, and 310B correspond to rotating shaft 106B of FIG. 1. At least one of rotating shafts 306A and 306B, rotating shafts 308A and 308B, and/or rotating shafts 310A and 310B may be coupled by at least one of shaft coupling interfaces 302A-C, respectively. Motor drives 304 correspond to front motor assemblies 204A, rear motor assemblies 204B, and/or motor drives 206, 208, 260, and 270 of FIG. 2.

Each of rotating shafts 308A and 308B are affixed to a respective output gear which is coupled to either rotating shaft 306A or 306B via gear mesh 316A and 316B. Each of gear mesh 316A and 316B translate rotating motion of rotating shafts 308A and 308B to rotating shafts 3068A and 306B, respectively. Alternatively, the translation of motion may be reversed where motor drives 304 are arranged along central axis 120 A and/or 120B. As shown in FIG. 3, each of rotating shafts 306A and 306B correspond to output shafts for gearbox assembly 300. Based on gear reductions and gear handedness of each of gear meshes 314A, 314B, 316A, and 316B, rotational motion input to gearbox assembly 300 by each of motor drives 304 is translated to rotating shafts 306A and 306B such that elements coupled or affixed to each of rotating shafts 306A and 306B (e.g., wheel assemblies) are actuated according to the transferred rotational motion (e.g., as shown in FIG. 2).

FIG. 4 depicts gearbox load reduction assembly process 400, in accordance with some embodiments of the disclosure. Gearbox load reduction assembly process 400 may utilize any or all the elements depicted in, or described in reference to, FIGS. 1-3, 5, and 6.

In some embodiments, at 402 a first part of a gearbox assembly (e.g., gearbox assembly 300 of FIG. 3), comprising at least a first rotating shaft that is at least one of actuated by or driven by a first motor, is retrieved. At 404, a first tapered bearing is arranged against a first shoulder of a housing of the gearbox assembly (e.g., according to the orientation described in reference to FIG. 1). At 406, a first retaining feature is secured against a surface of the first tapered bearing opposite a surface of the first tapered bearing arranged against the first shoulder of the housing. At 408, a second part of the gearbox assembly, comprising at least a second rotating shaft that is at least one of actuated by or driven by a second motor, is retrieved. At 410, a second tapered bearing is arranged against a second shoulder of the housing of the gearbox assembly (e.g., according to the orientation described in reference to FIG. 1). At 412, a second retaining feature is secured against a surface of the second tapered bearing opposite a surface of the second tapered bearing arranged against the second shoulder of the housing.

Process blocks 414, 416, and 418 are directed to a process corresponding to aspects of the accompanying independent claim. Each of these process blocks should be considered fundamental to this present disclosure and technically significant in the manufacturing of the independent claims. At 414, a shim is arranged concentric to an end of the first rotating shaft. At 416, a central bearing (e.g., central bearing 110 of FIG. 1) is arranged concentric to an end of the second rotating shaft. At 418, the end of the first rotating shaft is coupled to the end of the second rotating shaft at an interface (e.g., any of shaft coupling interfaces 302 A-C of FIG. 3) such that a surface of the central bearing contacts and generates a preload against an opposing surface of the shim. In some embodiments, the first part of the gearbox assembly is affixed to the second part of the gearbox assembly at 420.

Figure 5:
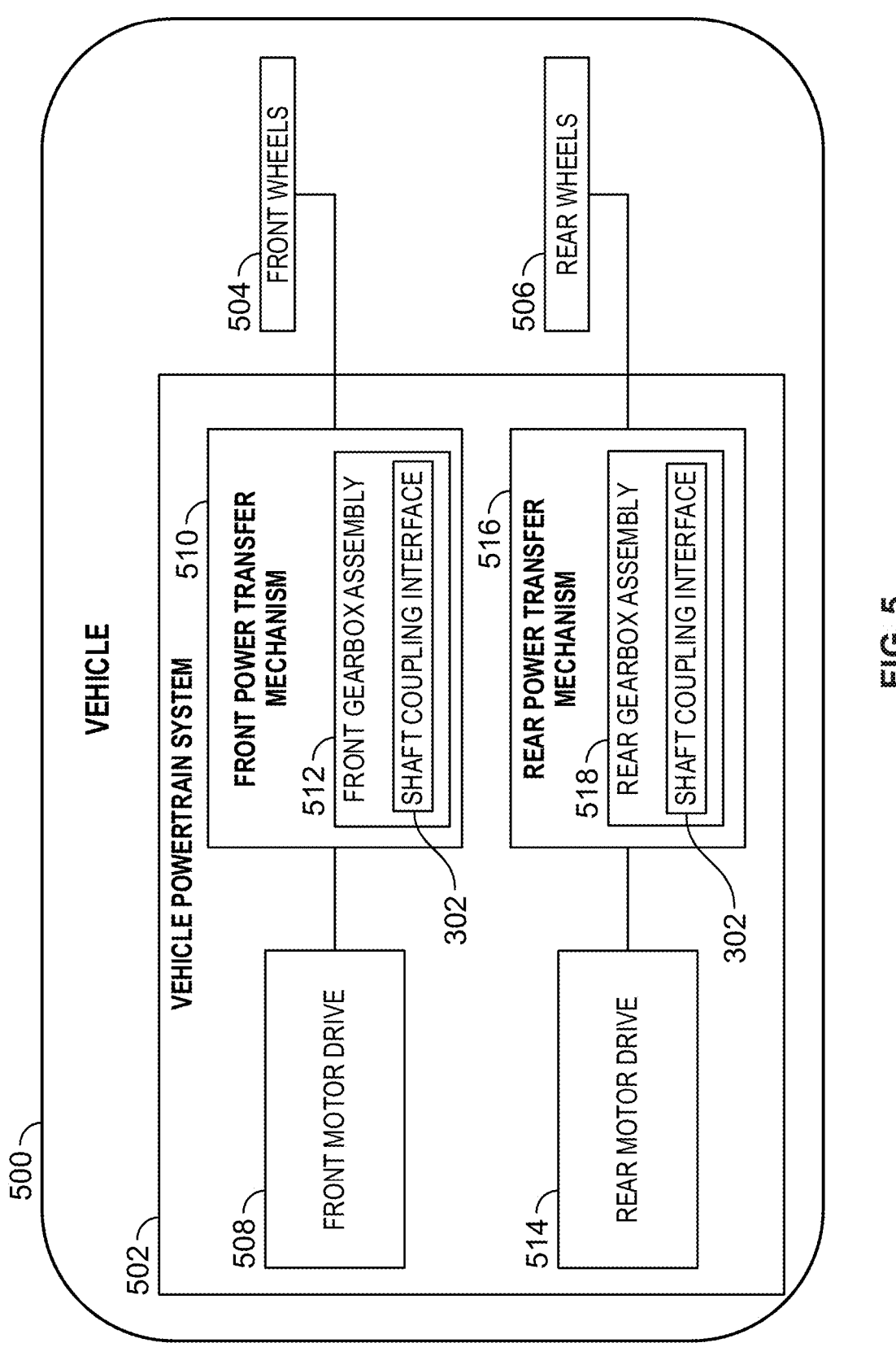
FIG. 5 is a block diagram representing an illustrative vehicle assembly comprising a gearbox assembly configured to reduce loads transferred between interfacing components of the gearbox assembly in accordance with embodiments of the disclosure.

FIG. 5 depicts vehicle assembly 500, in accordance with embodiments of the disclosure. Vehicle assembly 500 may comprise fewer, or additional, features than those depicted in FIG. 5. Vehicle assembly 500 may comprise any features or may be used in combination with any element depicted in, or described in reference to, FIGS. 1-4 and 6.

Vehicle assembly 500 comprises vehicle powertrain system 502 as well as front wheel 504 and rear wheels 506 (e.g., corresponding to wheels not shown in FIG. 2 that would be at least one of actuated by or driven by motor drives 204A and 204B). Vehicle powertrain system 502 comprises front motor drive 508 and rear motor drive 514. Front motor drive 508 is coupled to front power transfer mechanism 510. In some embodiments, front motor drive 508 comprises a pair of opposing motors each independently actuating rotating shafts (e.g., motor drives 204A of FIG. 2). Front power transfer mechanism 510 comprises front gearbox assembly 512. Front gearbox assembly 512 may correspond to at least one of gearbox assembly 102 of FIG. 1, gearbox assembly 202A and 202B of FIG. 2, or gearbox assembly 300 of FIG. 3. Front gearbox assembly 512 further comprises shaft coupling interface 302 to couple independently actuated rotating shafts within front gearbox assembly 512. Rear motor drive 514 is coupled to rear power transfer mechanism 516. In some embodiments, rear motor drive 514 comprises a pair of opposing motors each independently actuating rotating shafts (e.g., motor drives 204B of FIG. 2). Rear power transfer mechanism 516 comprises rear gearbox assembly 518. Rear gearbox assembly 518 may correspond to at least one of gearbox assembly 102 of FIG. 1, gearbox assembly 202A and 202B of FIG. 2, or gearbox assembly 300 of FIG. 3. Rear gearbox assembly 518 further comprises shaft coupling interface 302 to couple independently actuated rotating shafts within rear gearbox assembly 518. In some embodiments, each of front gearbox assembly 512 and rear gearbox assembly 518 are assembled using at least a portion of gearbox load reduction assembly process 400 of FIG. 4. Additionally, each of front gearbox assembly 512 and rear gearbox assembly 518 may comprise at least one of the gearbox housing configurations of FIG. 6. Front power transfer mechanism 510 and rear power transfer mechanism 516 may further comprise a pulley system, or other mechanism for transferring shaft work, corresponding to different drive axes (e.g., a front and rear drive axis). Vehicle assembly 500 may be the same as vehicle assembly 200 of FIG. 2, for example, wherein front gearbox assembly 210 and rear gearbox assembly 220 correspond to front gearbox assembly 512 and rear gearbox assembly 518, respectively.

Figure 6:
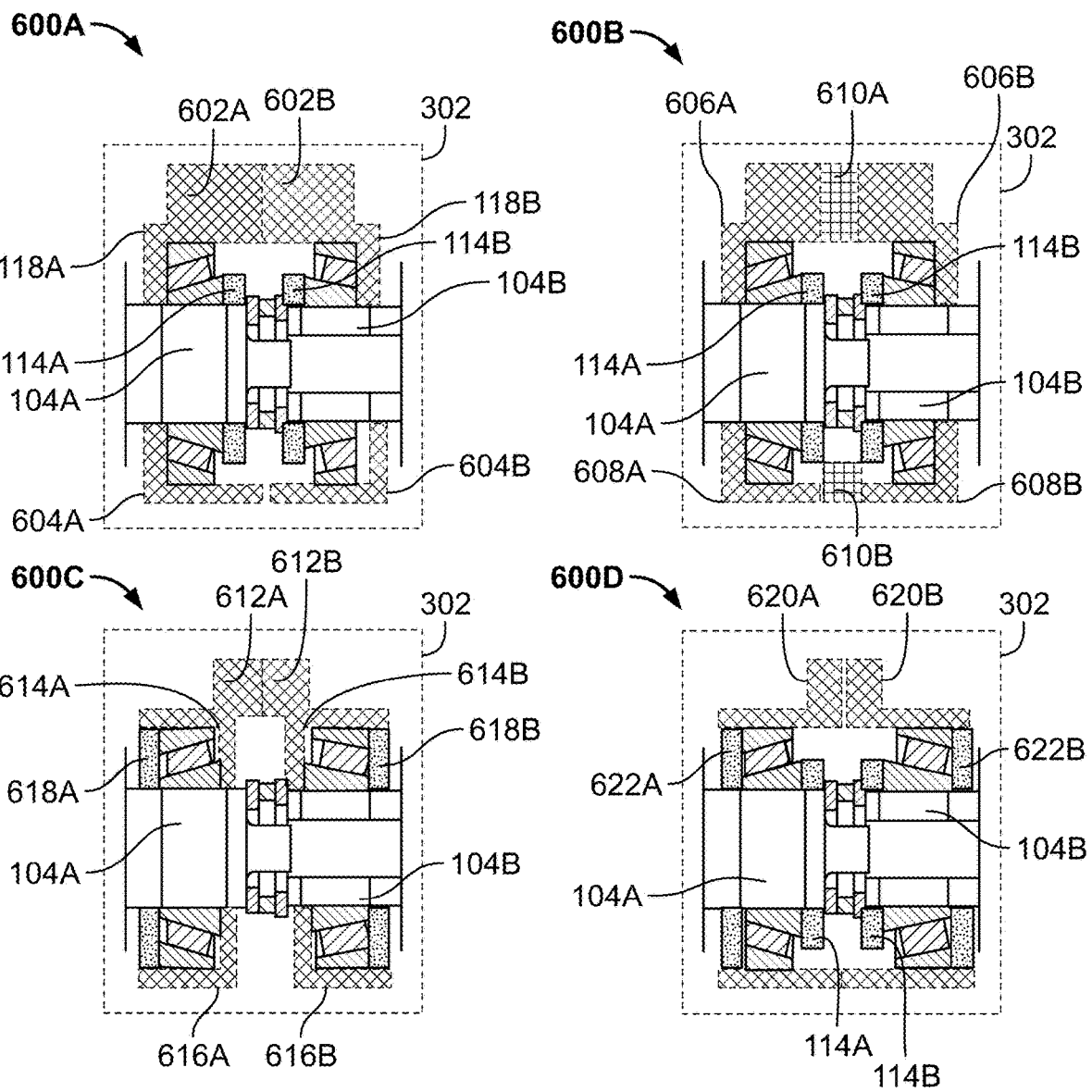
FIG. 6 depicts cross sectional views of different gearbox housing features, in accordance with some embodiments of the disclosure.

FIG. 6 depicts gearbox housing cross sectional views 600A-D, in accordance with some embodiments of the disclosure. Each of gearbox housing cross sectional views 600A-D may comprise fewer, or additional, features than those depicted in FIG. 6. Each of gearbox housing cross sectional views 600A-D may comprise any features or may be used in combination with any element depicted in, or described in reference to, FIGS. 1-5.

Gearbox housing cross section view 600A depicts a first embodiment of shaft coupling interface 302 of FIG. 1 (e.g., corresponding to shaft coupling interfaces 302A-C of FIG. 3). As shown, first tapered bearing 104A and second tapered bearing 104B of FIG. 1 are arranged within gearbox housing portions 602A and 602B, respectively. Each of gearbox housing portions 602A and 602B comprises a respective one of first shoulder 118A and second shoulder 118B. In this embodiment, first shoulder 118A and second shoulder 118B comprise material continuous with gearbox housing portions 602A and 602B, respectively, and form opposing recesses within gearbox housing portions 602A and 602B. A preload or securing force against each of first shoulder 118A and second shoulder 118B is used to retain each of first tapered bearing 104A and 104B by arranging each of first retaining feature 114A and second retaining feature 114B of FIG. 1 against respective surfaces of each of first tapered bearing 104A and second tapered bearing 104B that are opposite a surface of first tapered bearing 104A and second tapered bearing 104B that abut each of first shoulder 118A and second shoulder 118B, respectively. Each of first retaining feature 114A and second retaining feature 114B may comprise at least one of a snap ring, a securing nut, a threaded interface, a packing ring, or other securing element configured to prevent movement of a bearing relative to a housing and a rotating shaft. Gearbox housing shoulders 604A and 604B provide a second point of contact between each of first tapered bearing 104A and second tapered bearing 104B, respectively, to reduce and/or eliminate movement of each of first tapered bearing 104A and second tapered bearing 104B relative to the gearbox housing as rotating shafts, around which first tapered bearing 104A and second tapered bearing 104B are arranged, are at least one of actuated by or driven by motors or motor drives. Gearbox housing portions 602A and 602B may be affixed or fixedly attached to each other as part of an overall gearbox assembly to prevent the ingress of elements from an environment of the gearbox assembly from entering interfaces internal to the gearbox assembly.

Gearbox housing cross section view 600B depicts a second embodiment of shaft coupling interface 302 of FIG. 1 (e.g., corresponding to shaft coupling interfaces 302A-C of FIG. 3). As shown, first tapered bearing 104A and second tapered bearing 104B of FIG. 1 are arranged within gearbox housing shoulders 606A and 606B, respectively. Arranged between gearbox housing shoulders 606A and 606B is intermediate housing portion 610A, corresponding to intermediate housing 252 of FIG. 2. Additionally, gearbox housing shoulders 608A and 608B comprise material continuous with each of gearbox housing shoulders 606A and 606B respectively, forming a second point of contact between the gearbox housing shoulders and each of first tapered bearing 104A and 104B, respectively. Arranged between gearbox housing shoulders 608A and 608B is intermediate housing portion 610B, which comprises material continuous with intermediate housing portions 610A. A preload or securing force against each of gearbox housing shoulders 606A, 606B, 608A, and 608A is used to retain each of first tapered bearing 104A and 104B by arranging each of first retaining feature 114A and second retaining feature 114B of FIG. 1 against respective surfaces of each of first tapered bearing 104A and second tapered bearing 104B that are opposite a surface of first tapered bearing 104A and second tapered bearing 104B that abut each respective gearbox housing shoulder. Each of first retaining feature 114A and second retaining feature 114B may comprise at least one of a snap ring, a securing nut, a threaded interface, a packing ring, or other securing element configured to prevent movement of a bearing relative to a housing and a rotating shaft. Gearbox housing shoulders 606A, 606B, and intermediate housing portions 610A may be affixed or fixedly attached to each other as part of an overall gearbox assembly to prevent the ingress of elements from an environment of the gearbox assembly from entering interfaces internal to the gearbox assembly.

Gearbox housing cross section view 600C depicts third embodiment of shaft coupling interface 302 of FIG. 1 (e.g., corresponding to shaft coupling interfaces 302A-C of FIG. 3). As shown, first tapered bearing 104A and second tapered bearing 104B of FIG. 1 are arranged within gearbox housing portions 612A and 612B, respectively. Each of gearbox housing portions comprise first interior shoulder 614A and second interior shoulder 614B, respectively. In this embodiment, first interior shoulder 614A and second interior shoulder 614B comprise material continuous with gearbox housing portions 612A and 612B, respectively, and form recesses with openings facing directions opposed to a coupling interface between rotating shafts around which each of first tapered bearing 104A and second tapered bearing 104B are arranged. A preload or securing force against each of first interior shoulder 614A and second interior shoulder 614B is used to retain each of first tapered bearing 104A and 104B by arranging each of first exterior retaining feature 618A and second exterior retaining feature 618B against respective surfaces of each of first tapered bearing 104A and second tapered bearing 104B that are opposite a surface of first tapered bearing 104A and second tapered bearing 104B that abut each of first interior shoulder 614A and second interior shoulder 614B, respectively. Each of first exterior retaining feature 618A and second exterior retaining feature 618B may comprise at least one of a snap ring, a securing nut, a threaded interface, a packing ring, or other securing element configured to prevent movement of a bearing relative to a housing and a rotating shaft. Gearbox housing interior shoulders 616A and 616B provide a second point of contact between each of first tapered bearing 104A and second tapered bearing 104B, respectively, to reduce movement of each of first tapered bearing 104A and second tapered bearing 104B relative to the gearbox housing as rotating shafts, around which first tapered bearing 104A and second tapered bearing 104B are arranged, are at least one of actuated by or driven by motors or motor drives. Gearbox housing portions 612A and 612B may be affixed or fixedly attached to each other as part of an overall gearbox assembly to prevent the ingress of elements from an environment of the gearbox assembly from entering interfaces internal to the gearbox assembly.

Gearbox housing cross section view 600D depicts a fourth embodiment of shaft coupling interface 302 of FIG. 1 (e.g., corresponding to shaft coupling interfaces 302A-C of FIG. 3). As shown, first tapered bearing 104A and second tapered bearing 104B of FIG. 1 are arranged within gearbox housing portions 620A and 620B, respectively. Gearbox housing portion 620A is configured to receive and interface with first retaining feature 114A, and first external retaining feature 622A. Gearbox housing portion 620B is configured to receive and interface with second retaining feature 114B, and second external retaining feature 622B. A preload or securing force against each of first external retaining features 622A and second external retaining features 622B is used to retain each of first tapered bearing 104A and 104B by arranging each of first retaining feature 114A and second retaining feature 114B of FIG. 1 against respective surfaces of each of first tapered bearing 104A and second tapered bearing 104B that are opposite a surface of first tapered bearing 104A and second tapered bearing 104B that abut each of first external retaining feature 622A and second external retaining feature 622B, respectively. Each of first retaining feature 114A, second retaining feature 114B, first external retaining feature 622A, and second external retaining feature 622B may comprise at least one of a snap ring, a securing nut, a threaded interface, a packing ring, or other securing element configured to prevent movement of a bearing relative to a housing and a rotating shaft. Gearbox housing portions 620A and 620B may be affixed or fixedly attached to each other as part of an overall gearbox assembly to prevent the ingress of elements from an environment of the gearbox assembly from entering interfaces internal to the gearbox assembly.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A gearbox assembly comprising:
a first tapered bearing coupled to a first rotating shaft;
a second tapered bearing coupled to a second rotating shaft; and
a central bearing arranged concentric to the first rotating shaft or the second rotating shaft, wherein:
the first rotating shaft and the second rotating shaft are preloaded against each other through the central bearing based on an arrangement of a shim that contacts an external surface of the central bearing and contacts an external surface of one of the first tapered bearing or the second tapered bearing.

2. The gearbox assembly of claim 1, wherein the shim is arranged concentric to an end of the first rotating shaft or the second rotating shaft.

3. The gearbox assembly of claim 1, wherein the shim is configured to compress in response to opposing loads transmitted through the gearbox assembly.

4. The gearbox assembly of claim 1, wherein the first tapered bearing and the second tapered bearing are arranged such that tapered rollers of the first tapered bearing oppose tapered rollers of the second tapered bearing.

5. The gearbox assembly of claim 1, wherein:
the first tapered bearing is arranged to oppose axial loads from the second rotating shaft through the first rotating shaft; and
the second tapered bearing is arranged to oppose axial loads from the first rotating shaft through the second rotating shaft.

6. The gearbox assembly of claim 1, wherein:
the first rotating shaft is driven independent of the second rotating shaft; and
the second rotating shaft is driven independent of the first rotating shaft.

7. The gearbox assembly of claim 1, wherein:
a first gear is affixed to the first rotating shaft;
a second gear is affixed to the second rotating shaft;
the second gear comprises an opposite handedness to the first gear; and
the first gear and second gear are configured such that when both the first and second gears are driven in a same rotational direction, axial forces generated by each respective gear are at least partially cancelled through the central bearing.

8. The gearbox assembly of claim 1, wherein:
a first retaining feature is arranged against a first surface of the first tapered bearing and is configured to secure the first tapered bearing against a first shoulder of a housing; and
a second retaining feature is arranged against a first surface of the second tapered bearing and is configured to secure the second tapered bearing against a second shoulder of the housing.

9. The gearbox assembly of claim 1, further comprising a housing, wherein the housing comprises:
a first shoulder arranged to abut a second surface of the first tapered bearing;
a second shoulder arranged to abut a second surface of the second tapered bearing; and
wherein a central axis of the first shoulder and a central axis of the second shoulder are aligned.

10. A dual motor powertrain comprising:
a first motor coupled to a first gearbox assembly, the first gearbox assembly comprising:
a first rotating shaft that is rotated based on operation of the first motor, and
a first tapered bearing coupled to the first rotating shaft; and
a second motor coupled to a second gearbox assembly, the second gearbox assembly comprising:
a second rotating shaft that is rotated based on operation of the second motor, and
a second tapered bearing coupled to the second rotating shaft;
wherein:
a coupling interface is arranged between axial ends of the first rotating shaft and the second rotating shaft,
the coupling interface comprises a shim in contact with a central bearing;
the central bearing is arranged concentric to the first rotating shaft or the second rotating shaft;
the coupling interface is configured to at least partially cancel axial loads generated by each of the first rotating shaft and the second rotating shaft; and
the first rotating shaft and the second rotating shaft are preloaded against each other through the central bearing based on an arrangement of the shim such that the shim contacts an external surface of the central bearing and contacts an external surface of one of the first tapered bearing or the second tapered bearing.

11. The dual motor powertrain of claim 10, wherein the central bearing is arranged concentric to an axial end of the first rotating shaft or an axial end of the second rotating shaft.

12. The dual motor powertrain of claim 11, wherein the shim is configured to compress in response to opposing loads received from the first gearbox assembly and the second gearbox assembly.

13. The dual motor powertrain of claim 10, wherein:

a first dynamic bearing, configured to stabilize rotational motion of the first rotating shaft, is arranged concentric to the first rotating shaft and outboard of the first tapered bearing; and a second dynamic bearing, configured to stabilize rotational motion of the second rotating shaft, is arranged concentric to the second rotating shaft and outboard of the second tapered bearing.

14. The dual motor powertrain of claim 13, wherein:

the first tapered bearing and the second tapered bearing are arranged such that a first back face of the first tapered bearing is facing an opposed second back face of the second tapered bearing.

15. The dual motor powertrain of claim 10, wherein a first retaining feature is arranged against a first surface of a first tapered bearing concentric to the first rotating shaft and is configured to secure the first tapered bearing against a first shoulder of a housing.

16. The dual motor powertrain of claim 15, wherein a second retaining feature is arranged against a first surface of the second tapered bearing concentric to the second rotating shaft and is configured to secure the second tapered bearing against a second shoulder of the housing.

17. The dual motor powertrain of claim 10, further comprising a housing, wherein the housing comprises:

a first shoulder arranged to abut a second surface of the first tapered bearing; and a second shoulder arranged to abut a second surface of the second tapered bearing.

18. The dual motor powertrain of claim 10, wherein the central bearing comprises one or more of a flexure bearing, a composite bearing, a rolling-element bearing, a fluid bearing, or a magnetic bearing.

19. A method of assembling a gearbox assembly configured to reduce transferred loads generated by coupled rotating shafts comprising:

arranging a shim concentric to an end of a first rotating shaft, wherein a first tapered bearing is coupled to the first rotating shaft;

arranging a central bearing concentric to the first rotating shaft or a second rotating shaft, wherein a second tapered bearing is coupled to the second rotating shaft; and coupling the end of the first rotating shaft to the end of the second rotating shaft at an interface such that a surface of the central bearing contacts and generates a preload against an opposing surface of the shim, wherein:

the first rotating shaft and the second rotating shaft are preloaded against each other through the central bearing based on an arrangement of the shim, the shim is arranged to contact an external surface of the central bearing, and the shim is arranged to contact an external surface of one of the first tapered bearing or the second tapered bearing.

* * * * *